(12) United States Patent
DiChiara, Jr.

(10) Patent No.: US 6,494,979 B1
(45) Date of Patent: Dec. 17, 2002

(54) BONDING OF THERMAL TILE INSULATION

(75) Inventor: Robert A. DiChiara, Jr., Carlsbad, CA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 09/676,682

(22) Filed: Sep. 29, 2000

(51) Int. Cl.[7] .............................................. B32B 31/26
(52) U.S. Cl. ..................... 156/89.11; 156/258; 156/295
(58) Field of Search ............................ 156/89.11, 258, 156/295

(56) References Cited

U.S. PATENT DOCUMENTS

| | | | |
|---|---|---|---|
| 3,634,250 A | * | 1/1972 | Commons, Jr. |
| 3,702,279 A | * | 11/1972 | Ardary et al. |
| 3,952,083 A | | 4/1976 | Fletcher et al. |
| 3,955,034 A | * | 5/1976 | Fletcher et al. |
| 4,148,962 A | * | 4/1979 | Leiser et al. |
| 4,244,761 A | * | 1/1981 | Remi et al. |
| 4,279,952 A | * | 7/1981 | Kodama et al. |
| 4,338,368 A | | 7/1982 | Dotts et al. |
| 4,358,480 A | | 11/1982 | Ecord et al. |
| 4,452,749 A | | 6/1984 | Kolvek et al. |
| 4,542,888 A | | 9/1985 | Robyn et al. |
| 5,079,082 A | | 1/1992 | Leiser et al. |
| 5,092,765 A | | 3/1992 | Wahlfeld |
| 6,099,671 A | * | 8/2000 | Pearson et al. ........... 156/89.11 |
| 6,183,852 B1 | * | 2/2001 | Rorabaugh et al. |

FOREIGN PATENT DOCUMENTS

GB    2 055 867    *   3/1981

* cited by examiner

Primary Examiner—Curtis Mayes
(74) Attorney, Agent, or Firm—Harness, Dickey & Pierce, P.L.C.

(57) ABSTRACT

An insulative body having first and second porous insulation members and a ceramic binder. Each of the first and second porous insulation members is formed of a fibrous, low-density silica-based material and cooperatively defines a joint. The ceramic binder is disposed between a pair of mating surfaces that form the joint. The ceramic binder couples the first and second porous insulation members together. A method for bonding insulative bodies to one another through the use of an ceramic/organic thermal setting binder is also provided.

16 Claims, 2 Drawing Sheets

BONDING OF THERMAL TILE INSULATION

TECHNICAL FIELD

The present invention relates generally to thermal insulation tiles and more particularly to a method for bonding thermal insulation tiles.

BACKGROUND OF THE INVENTION

BACKGROUND ART

Thermal insulation tiles, such as those used to insulate the space shuttle orbiter, are typically formed from low-density fibrous materials having extremely high temperature resistance and a relatively low coefficient of thermal expansion as compared to metals. These materials are well known in the art and include, for example, FRCI (fibrous refractory composite insulation) and AETB (alumina enhanced thermal barrier) materials.

In fabricating the tiles, fibers of an insulating material, such as silica, alumina boro-silicate and alumina, are mixed with water to form a slurry. The slurry is deposited into a casting tower where the water is drained and the silica fibers are subjected to compressive forces to form a raw block of insulation material having a cross-sectional area that may range from 144 square inches to almost 576 square inches depending upon the dimensions of the casting tower. The raw block is then dried in an oven and subsequently fired (sintered) to bond the fibers of the insulating material together. Thereafter, tiles are formed from the fired block through conventional machining processes wherein tiles of a desired shape are cut from the solid block.

One drawback associated with this process is the maximum size of the tiles that can be formed. As the surface of the space shuttle orbiter, for example, is relatively large, it is highly desirable to form the tile as large as possible so as to reduce the labor that is required to affix the tiles to the orbiter, as well as minimize the use of the material which bonds the tiles to the orbiter to thereby minimize the weight of the orbiter'sthermal protection system. In covering a leading or trailing edge of a craft, a tile having a length in excess of 6 feet is highly desirable.

To some extent, the size of the tiles may be increased by enlarging the size of the casting tower. In practice, however, casting towers that produce raw blocks having dimensions greater than 22"×22"×7" inches are not practical due to the increased rate at which defects and other problems are encountered in the manufacturing process. Problems such as weight associated with transporting a large block filled with water, the inability to completely dry very large raw blocks, overheating the exterior portion of the raw block during the firing operation and underheating the interior portion of the raw block during the firing operation frequently lead to defects such as shrinking, cracking and improper bonding of the fibers. As the material that is used to form the raw blocks is relatively expensive, the increased rate of defects renders the formation of relatively large fired blocks commercially impracticable.

Another drawback associated with the previously known methods of forming tiles concerns the manner in which tiles having a complex shape are formed. Tiles which are relatively flat and sized approximately equal to the cross-section of the fired block are relatively easy to machine with little waste. Tiles having a complex shape, however, are routinely carved from a fired block, with the remainder of the fired block being discarded as scrap. As mentioned above, the material that is used to form the raw blocks is relatively expensive. Consequently, tiles that are produced in a process wherein large amounts of the fired blocks are scrapped are extremely costly to produce.

Accordingly, there remains a need in the art for a method for forming relatively large insulation tiles. There also remains a need in the art for a method for forming a complex shaped insulation tile which produces relatively less scrap. There also remains a need in the art for a method for bonding insulation tiles together.

SUMMARY OF THE INVENTION

In one preferred form, the present invention provides an insulative body having first and second porous insulation members and a binder. Each of the first and second porous insulation members is formed of a fibrous, low-density silica-based material and cooperatively defines a joint. The binder is disposed between a pair of mating surfaces that form the joint. The binder couples the first and second porous insulation members together.

In another preferred form, the present invention provides a method for coupling a first porous insulation member to a second porous insulation member wherein each of the first and second porous insulation members are formed of a fibrous, low-density silica-based material. The method includes the steps of: providing an ceramic/organic thermal setting binder having a thermal set organic binder and a ceramic binder; applying the ceramic/organic thermal setting binder between a pair of mating surfaces formed into the first and second porous insulation members; heating the first and second porous insulation members to a first predetermined temperature to initially cause the thermal set organic binder distribute the ceramic binder through a joint formed by the mating surfaces of the first and second porous insulation members and thereafter cure the organic binder to form a well bonded joint; heating the bonded first and second porous insulation members to a second predetermined temperature to bum out the thermal set organic binder; and firing the bonded first and second porous insulation members at a third predetermined temperature to cause the ceramic binder to fixedly couple the mating surfaces of the first and second porous insulation members to one another.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
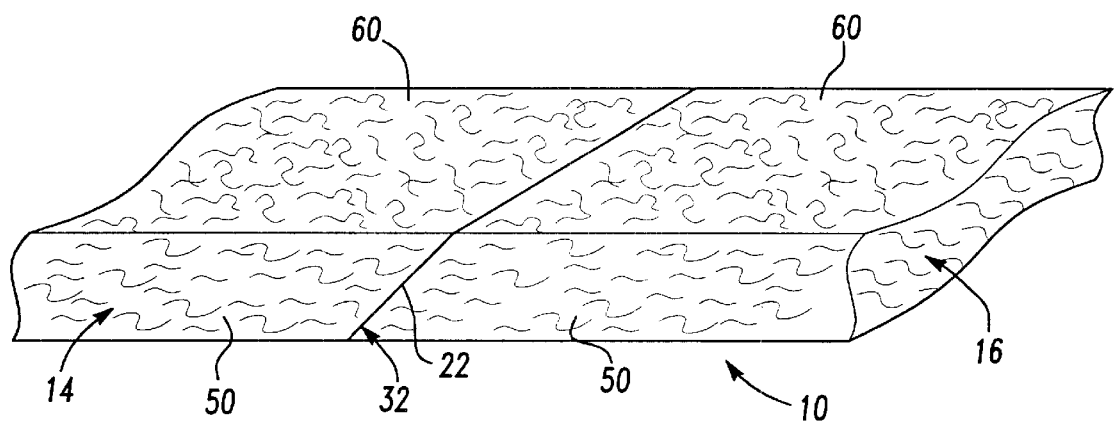
FIG. 1 is a perspective view of an insulative body formed in accordance with the teachings of the present invention.
Figure 2:
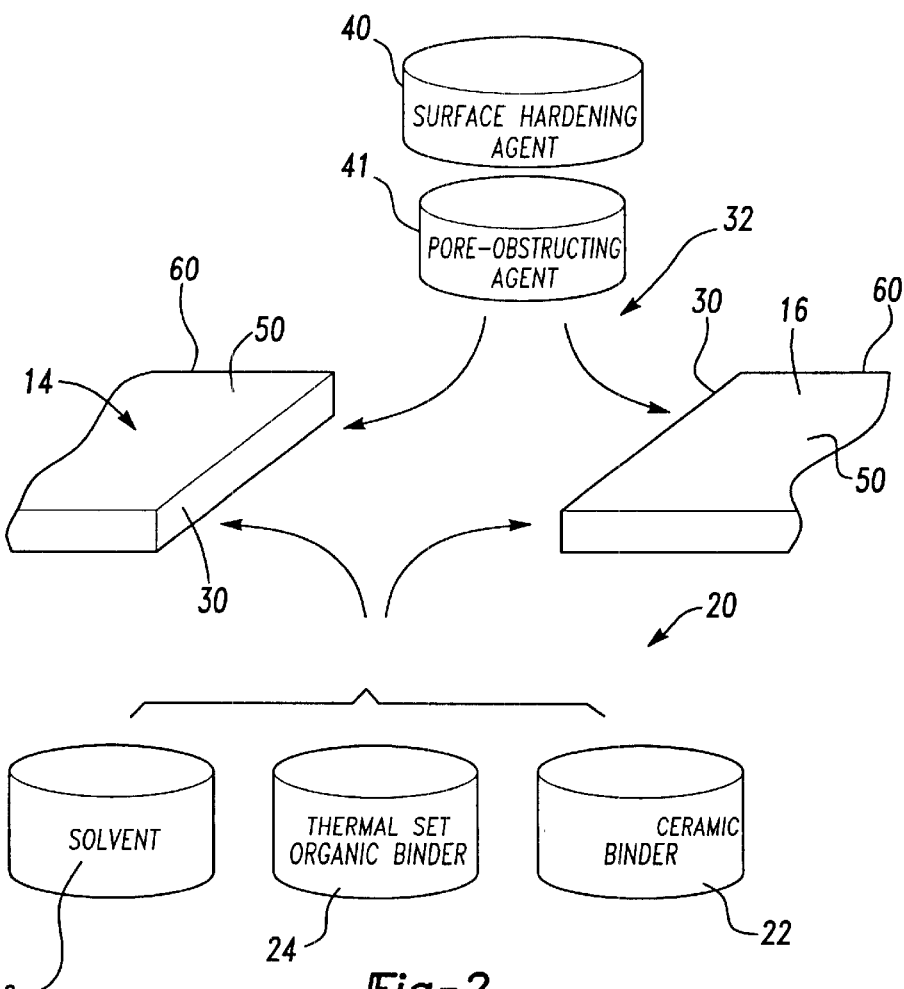
FIG. 2 is a schematic illustration of the method of the present invention.

With reference to FIGS. 1 and 2 of the drawings, an insulating body constructed in accordance with the teachings of the present invention is generally indicated by reference numeral 10. Insulating body 10 is shown to include first and second tile members 14 and 16, respectively, and a ceramic/organic thermal setting binder 20. First and second tile members 14 and 16 are extremely porous, being constructed from a fibrous, low-density silica-based material. First and second tile members 14 and 16 are preferably formed from a homogeneous alumina enhanced thermal barrier (AETB) material which is well known in the art and more fully described in Leiser et al., "Options for Improving Rigidized Ceramic Heatshields", Ceramic Engineering and Science Proceedings, 6, No. 7–8, pp. 757–768 (1985) and Leiser et al., "Effect of Fiber Size and Composition on Mechanical and Thermal Properties of Low Density Ceramic Composite Insulation Materials", NASA CP 2357, pp. 231–244 (1984). As those skilled in the art will understand, however, first and second tile members 14 and 16 may be formed from other fibrous low-density silica-based materials including, for example, fibrous refractory composite insulation (FRCI), which is well known in the art and more fully described in U.S. Pat. No. 4,148,962, the disclosure of which is hereby incorporated by reference as if fully set forth herein.

As best shown in FIG. 2, the ceramic/organic thermal setting binder 20 includes a ceramic binder 22 and a thermal set organic binder 24. The ceramic binder 22 may be glass, such as Ferro Corporation'sEG0002, EG1001 and EG2790 electronic glasses, or ceramic, such as an aluminum oxide and silica mixture, and is selected on the basis of its coefficient of thermal expansion. Preferably, the coefficient of thermal expansion of the ceramic binder 22 is about equal to the coefficient of thermal expansion of the first and second tile members 14 and 16.

The thermal set organic binder 24 is an agent that aids in the processing of insulating body 10. In this regard, the thermal set organic binder 24 is an agent that is employed to temporarily bond the first and second tile members 14 and 16 to one another. Additionally, the thermal set organic binder 24 is an agent that assists in the distribution of the ceramic binder 22 as will be discussed in greater detail, below. Examples of suitable thermal set organic binders 24 include epoxies and acrylics.

The thermal set organic binder 24 and ceramic binder 22 are combined and preferably thinned out (i.e., the thermal set organic binder 24 is at least partially dissolved) to a desired viscosity with a suitable solvent 26. The ceramic/organic thermal setting binder 20 is then applied to the pair of mating surfaces 30 that form the joint 32 between the first and second tile members 14 and 16. In applying the ceramic/organic thermal setting binder 20 to the joint 32, it is highly desirable that the mating surfaces 30 are sufficiently wetted out so as to create a high quality bond. It is also desirable that the ceramic/organic thermal setting binder 20 not significantly wick into the porous and fibrous tile members 14 and 16 as relatively thinner bonds are more desirable (thinner bonds are lighter and less likely to affect the thermal and mechanical properties of the finished insulating body 10 as compared to relatively thicker bonds).

Once a desired amount of the ceramic/organic thermal setting binder 20 has been applied to the mating surfaces 30, the mating surfaces 30 are placed in contact with one another, the thermal set organic binder 24 bonds the first and second tile members 14 and 16 together and a tile assembly is formed. Measures may be taken to ensure that the mating surfaces 30 will remain in constant and continuous contact with one another during the subsequent processing step. Such measures are well known in the art and are typically employed in the fabrication of epoxy composites. One such measure is the use of a vacuum bag wherein the first and second tile members 14 and 16 are placed in a vacuum bag, the vacuum bag is coupled to a vacuum source (e.g., a vacuum pump) and air is evacuated from the vacuum bag to permit the atmosphere to exert pressure onto the joint 32 to maintain the mating surfaces 30 in constant and continuous contact with one another. Other measures include the use of an adhesive tape or the application of a small weight across the length and width of the joint, so as to exert a force onto the joint which maintains the mating surfaces 30 in constant and continuous contact with one another.

The tile assembly is next placed into an oven and slowly heated. As the temperature of the thermal set organic binder 24 increases, its viscosity lowers, permitting it to flow into through the joint 32 and into any open pores in the first and second tile members 14 and 16. As the thermal set organic binder 24 is mixed with the ceramic binder 22, the flowing action of the thermal set organic binder 24 assists in the distribution of the ceramic binder 22 by carrying the ceramic binder 22 through the joint 32 and into the open pores. Depending upon the particular type of thermal set organic binder 24 that is used, the thermal set organic binder 24 will set up at about 200–500° F., thereby fixing the position of the particles of the ceramic binder 22 that are distributed throughout the joint 32 and temporarily bonding the first and second tile members 14 and 16 to one another. The tile assembly may then be removed from the oven to permit any vacuum bags, weights, tape, etc. to be removed. Thereafter, the tile assembly is placed in a furnace where it is slowly heated to a temperature of about 800° F. to about 1000° F. and held within this temperature range for an appropriate time such as one hour, for example, to permit the thermal set organic binder 24 to burn-out of the joint 32 so as not to affect the weight, strength, thermal properties or coefficient of thermal expansion of the joint 32. Thereafter, the tile assembly is slowly heated to a temperature from about 1200° F. to about 2400° F. to permit the ceramic binder 22 to fuse the into the first and second tile members 14 and 16 and fixedly couple the mating surfaces 30 to one another.

Preferably, a surface hardening agent 40 is applied to the mating surfaces 30 of the joint 32 and cured prior to the application of the ceramic/organic thermal setting binder 20. Examples of suitable surface hardening agents 40 include silica sol and alumina sol. The cured surface hardening agent 40 is operable for partially filling the voids in the mating surfaces 30 to thereby limit the ability of the ceramic/organic thermal setting binder 20 to wick into the first and second tile members 14 and 16. If silica sol is employed as the surface hardening agent 40, it preferably includes small silica particles in the size range of from about 4 nanometers to about 150 nanometers. The silica particles are mixed with a carrier liquid, such as water with a small amount of ammonia such that the silica particles are present in an amount of from about 15 parts by weight to about 50 parts by weight of the mixture of silica and liquid, producing a mixture having the consistency of water. One operable silica sol of this type is commercially available as Nalco 2327 manufactured by Nalco Chemical Company. Curing is accomplished by heating the first and second tile members 14 and 16 to an elevated temperature, such as 300° F. until the liquid carrier has completely evaporated. If desired, a pore-obstructing material 41, such as cordierite or mullite, may be applied to the mating surfaces 30 of the joint 32 prior to the application of the surface hardening agent 40 to limit the depth with which the surface hardening agent 40 is permitted to penetrate.

Figure 3:
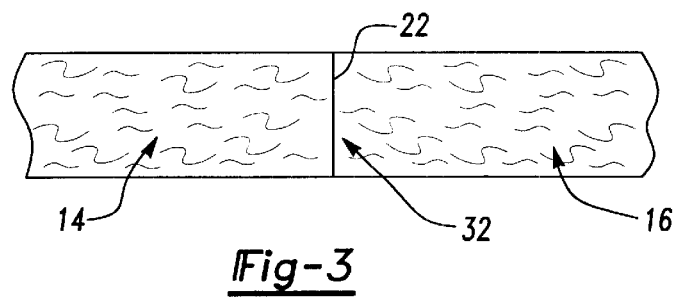
FIG. 3 is a side elevation view illustrating an alternate joint construction.

Also preferably, the first and second tile members 14 and 16 are formed with mitered end portions 50 so that the mating surfaces 30 are angled with respect to the exterior surfaces 60 of the first and second tile members 14 and 16. Construction of insulating body 10 in this manner increases the surface area of joint 32 as compared to a conventional butt joint 32 as illustrated in FIG. 3, to thereby increase the strength of insulating body 10 in the area of the joint 32. Also advantageously, the angling of the mating surfaces 30 relative to the exterior surfaces 60 permits any adverse effects of the ceramic/organic thermal setting binder 20 to be distributed over a path that is skewed to the direction through which thermal energy is transmitted through insulating body 10.

The following non-limiting examples describe the invention further and represent best modes for practicing the invention.

EXAMPLE I

Tile members 14 and 16 are formed from AETB with mitered end portions 50. A silica sol having silica particles that are mixed with a carrier liquid, such as Nalco 2327 which is commercially available from Nalco Chemical Company and 27 percent by weight of cordierite powder from Ferro Corporation, is applied to the mating surfaces 30 that are formed into the mitered end portions 50 of the tile members 14 and 16. The tile members 14 and 16 are dried at about 300° F. for about 30 minutes to harden the mating surfaces 30 and to substantially reduce the porosity of the mating surfaces. An ceramic/organic thermal setting binder 20 consisting of about 90 percent by weight of a ceramic binder 22 and about 10 percent by weight of a thermal set organic binder 24, such as an acrylic is provided. In the particular example provided, the ceramic binder 22 has a composition of about 0 percent by weight to about 90 percent by weight of aluminum oxide and 100 percent by weight to about 10 percent by weight of silica and preferably about 83.3 percent by weight of aluminum oxide and about 16.6 percent by weight of silica. The ceramic/organic thermal setting binder 20 is mixed with an acetone solvent to form a liquid having the consistency of milk. One or more coats of the ceramic/organic thermal setting binder 20 are applied to each of the mating surfaces 30 and the mating surfaces 30 are placed in contact with one another. The tile assembly is placed in a vacuum bag and a source of vacuum is applied to the vacuum bag to remove the air therefrom. The tile assembly is heated slowly in an oven to first 180° F. then to about 350° F. to cause the acrylic to temporarily bond the tile members 14 and 16 to one another. The tile assembly is removed from the oven, the vacuum bag is removed from the tile assembly and the tile assembly is thereafter heated slowly in a furnace such that the transition between approximately 800° F. to approximately 1000° F. is made in about one hour to permit the acrylic to burn out of the joint 32. The tile assembly is thereafter fired in the furnace at a temperature of about 1200° F. to about 2400° F., and preferably at about 2000° F., to fuse the ceramic binder (22) to the mating surfaces and fixedly couple the tile members 14 and 16 together.

EXAMPLE II

Tile members 14 and 16 are formed from AETB with mitered end portions 50. An ceramic/organic thermal setting binder 20 consisting of about 95 percent by weight of a ceramic binder 22, such as Ferro Corporation electronic glass EG002, EG1001 or EG2790, and about 5 percent by weight of a thermal set organic binder 24, such as ethocellulose, is mixed with a butyl carbitol acetate solvent to form a paste that is somewhat wetter than commercially available tomato paste. A first coat of the ceramic/organic thermal setting binder 20 is applied to each of the mating surfaces 30 and permitted to slightly wick into the tile members 14 and 16. A second coat of the cermic/organic thermal setting binder 20 is thereafter applied to the mating surfaces 30 and the mating surfaces 30 are placed in contact with one another. A small weight is applied to the assembly to ensure that the mating surfaces 30 remain in constant contact during the subsequent step. The tile assembly is then heated slowly to about 350° F. to set the ethocellulose and temporarily bond the tile members 14 and 16 to one another. The weight is thereafter removed and the tile assembly is heated slowly in a furnace such that the transition between approximately 800° F. to approximately 1000° F. is made in about one hour to permit the ethocellulose to burn out of the joint 32. The tile assembly is thereafter fired in the furnace at a temperature of about 2000° F. to about 2400° F. to fuse the electronic glass to the mating surfaces and fixedly couple the tile members 14 and 16 together.

EXAMPLE III

Tile members 14 and 16 are formed from FRCI with mitered end portions 50. A silica sol having silica particles that are mixed with a carrier liquid, such as Nalco 2327 which is commercially available from Nalco Chemical Company, is applied to the mating surfaces 30 that are formed into the mitered end portions 50 of the tile members 14 and 16. The tile members 14 and 16 are dried at about 300° F. for about 30 minutes to harden the mating surfaces 30 and to substantially reduce the porosity of the mating surfaces. An ceramic/organic thermal setting binder 20 consisting of about 90 percent by weight of a ceramic binder 22, such as Ferro Corporation electronic glass EG002, EG1001 or EG2790, and about 10 percent by weight of a thermal set organic binder 24, such as epoxy, is mixed with an acetone solvent to form a liquid having the consistency of milk. One or more coats of the ceramic/organic thermal setting binder 20 are applied to each of the mating surfaces 30 and the mating surfaces 30 are placed in contact with one another. The tile assembly is placed in a vacuum bag and a source of vacuum is applied to the vacuum bag to remove the air therefrom. The tile assembly is heated slowly in an oven to about 350° F. to cause the epoxy to temporarily bond the tile members 14 and 16 to one another. The tile assembly is removed from the oven, the vacuum bag is removed from the tile assembly and the tile assembly is thereafter heated slowly in a furnace such that the transition between approximately 800° F. to approximately 1000° F. is made in about one hour to permit the epoxy to burn out of the joint 32. The tile assembly is thereafter fired in the furnace at a temperature of about 2000° F. to about 2400° F. to fuse the electronic glass to the mating surfaces and fixedly couple the tile members 14 and 16 together.

EXAMPLE IV

Tile members 14 and 16 are formed from AETB with mitered end portions 50. A ceramic organic setting binder 20, such as Nippon Electronic Corporation electronic glass GA-13 is mixed with a butyl carbitol acetate solvent to form a paste that is somewhat wetter than commercially available tomato paste. A coat of the ceramic organic setting binder 20 is applied to each of the mating surfaces 30 and permitted to slightly wick into the tile members 14 and 16. A small weight is applied to the assembly to ensure that the mating surfaces 30 remain in constant contact during the subsequent step. The tile assembly is then heated slowly to about 200° F. to about 400° F. to evaporate the solvent and temporarily bond the tile members 14 and 16 to one another. The weight is thereafter removed and the tile assembly by heated slowly in a furnace such that the transition between approximately 800° F. to approximately 1000° F. is made in about one hour to permit the thermal set organic binder 24 to burn out of the joint 32. The tile assembly is thereafter fired in the furnace at a temperature of about 1300° F. to about 1800° F. to fuse the electronic glass to the mating surfaces 30 and fixedly couple the tile members 14 and 16 together.

Figure 4:
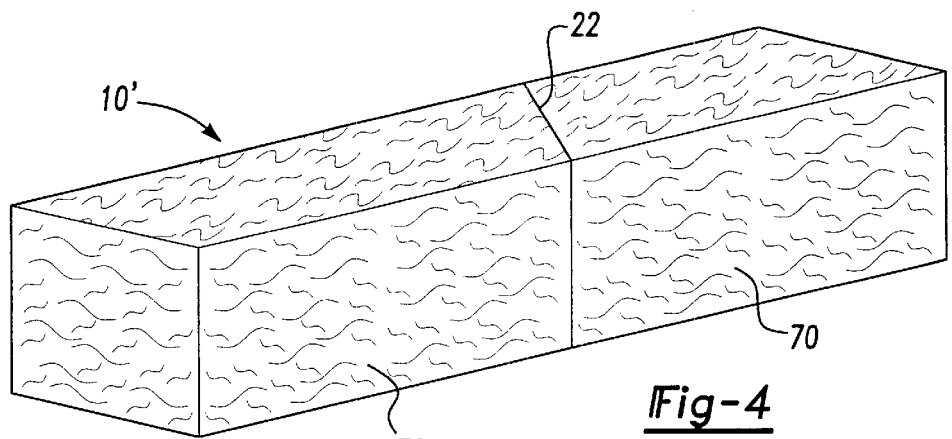
FIG. 4 is a perspective view of another insulative body formed in accordance with the teachings of the present invention.

While the insulating body 10 has been illustrated thus far as being a planar insulative tile formed from several substantially planar tile members, those skilled in the art will appreciate that the invention, in its broader aspects, may be constructed somewhat differently. For example, insulating body 10' may be formed from a plurality of fired blocks 70 of porous, fibrous, low-density silica-based material as illustrated in FIG. 4. In this arrangement, raw blocks formed in a casting tower are dried and fired in a furnace to produce fired blocks 70 in a process that is well known in the art. The fired blocks 70 are thereafter bonded together with an ceramic/organic thermal setting binder 20 of the type and in the manner disclosed above to produce a block assembly. The block assembly may thereafter be machined as desired. The bonding of fired blocks 70 is advantageous in that it substantially reduces the processing time associated with the preparation of the mating surfaces 30, the application of the ceramic/organic thermal setting binder 20, the curing of the thermal set organic binder 24 and the subsequent firing to set the ceramic binder 22.

Figure 5:
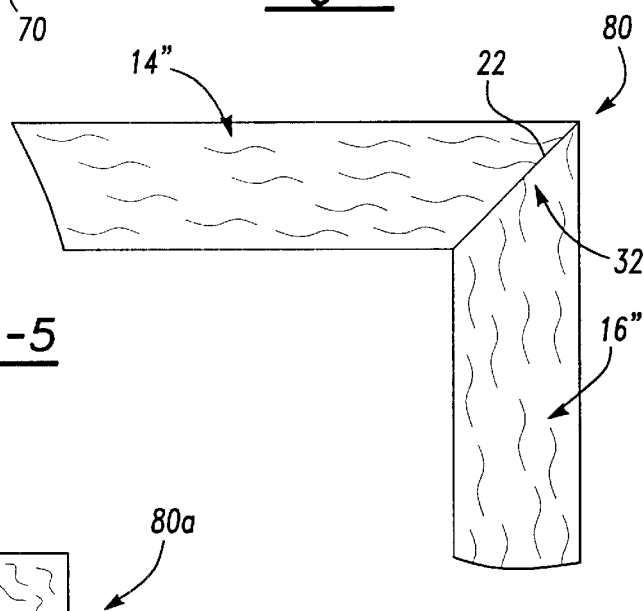
FIG. 5 is a side elevation view of the leading edge of a craft formed from insulative materials in accordance with the teachings of the present invention.
Figure 6:
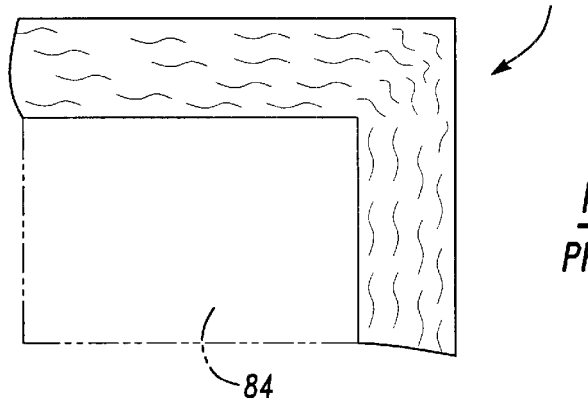
FIG. 6 is a side elevation view of a leading edge of a craft formed in accordance with the prior art.

Another arrangement is illustrated in FIG. 5 wherein a pair of tile members 14" and 16" are coupled to one another to form the leading edge 80 of a craft. Construction of the leading edge 80 from a plurality of planar tile members as illustrated in FIG. 5, as opposed to the prior art method of carving the leading edge 80a from a monolithic block 84 as illustrated in FIG. 6, is both extremely efficient and less costly due to a substantial reduction in the amount of waste that is generated to machine the leading edge 80.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for coupling a first porous insulation member to a second porous insulation member, each of the first and second porous insulation members being formed of a fibrous, low-density silica-based material, the method comprising the steps of:

providing a ceramic/organic thermal setting binder having a thermal set organic binder and a ceramic binder selected from a group of binders consisting of glass and ceramic;

applying the ceramic/organic thermal setting binder between a pair of mating surfaces formed into the first and second porous insulation members;

heating the first and second porous insulation members to a first predetermined temperature to cause the thermal set ceramic/organic binder to distribute the binder through a joint formed by the mating surfaces of the first and second porous insulation members and thereafter cure the organic binder to form a bonded joint;

heating the bonded first and second porous insulation members to a second predetermined temperature to burn out the thermal set organic binder; and firing the bonded first and second porous insulation members at a third predetermined temperature to cause the ceramic binder to fixedly couple the mating surfaces of the first and second porous insulation members to one another.

2. The method of claim 1, wherein before the step of applying the ceramic/organic thermal setting binder, the method includes the steps of:

providing a surface hardening agent in a liquid carrier;

applying the surface hardening agent to at least one of the pair of mating surfaces; and curing the surface hardening agent that has been applied to the at least one of the mating surfaces.

3. The method of claim 2, wherein the surface hardening agent is selected from a group of surface hardening agents consisting of silica sol and alumina sol.

4. The method of claim 3, wherein before the step of applying the surface hardening agent, the method further comprises the steps of:

providing a pore-obstructing material;

applying the pore-obstructing material to the at least one of the mating surfaces to thereby limit a depth with which the surface hardening agent is permitted to penetrate.

5. The method of claim 4, wherein the pore-obstructing material is selected from a group of pore-obstructing materials consisting of cordierite and mullite.

6. The method of claim 1, wherein before the step of applying the ceramic/organic thermal setting binder, the method includes the steps of:

providing a solvent; and employing the solvent to, adjust a viscosity of the ceramic/organic thermal setting binder.

7. The method of claim 1, wherein the first predetermined temperature is about 180° F. to about 400° F.

8. The method of claim 1, wherein the second predetermined temperature is about 800° F. to about 1000° F.

9. The method of claim 1, wherein the third predetermined temperature is about 1200° F. to about 2400° F.

10. The method of claim 1, wherein before the step of providing the ceramic/organic thermal setting binder, the method includes the step of mitering an end portion of each of the first and second porous insulation members.

11. The method of claim 10, wherein the ceramic binder includes aluminum oxide and silica.

12. The method of claim 1, wherein the ceramic binder includes about 0 percent by weight to about 90 percent by weight of aluminum oxide and about 100 percent by weight to about 10 percent by weight of silica.

13. The method of claim 12, wherein the ceramic binder includes about 83 percent by weight of aluminum oxide and about 16 percent by weight of silica.

14. The method of claim 12, wherein the ceramic/organic thermal setting binder includes about 90 percent by weight of the ceramic binder and about 10 percent by weight of an epoxy.

15. The method of claim 1, wherein the ceramic/organic thermal setting binder includes about 90 percent by weight of glass and about 10 percent by weight of acrylic.

16. The method of claim 1, wherein the ceramic/organic thermal setting binder includes about 95 percent by weight of glass and about 5 percent by weight of ethocellulose.

* * * * *